(12) United States Patent
Moore

(10) Patent No.: US 10,612,682 B1
(45) Date of Patent: Apr. 7, 2020

(54) MODULAR IRRIGATION VALVE HOUSING

(71) Applicant: Daniel Moore, Jacksonville, FL (US)

(72) Inventor: Daniel Moore, Jacksonville, FL (US)

( * ) Notice: Subject to any disclaimer, the term of this patent is extended or adjusted under 35 U.S.C. 154(b) by 0 days.

(21) Appl. No.: 15/944,494

(22) Filed: Apr. 3, 2018

(51) Int. Cl.
| | |
|---|---|
| *F16K 27/00* | (2006.01) |
| *A01G 25/16* | (2006.01) |
| *F16L 27/12* | (2006.01) |
| *F16L 37/12* | (2006.01) |
| *F16L 5/02* | (2006.01) |
| *E03B 9/08* | (2006.01) |
| *G01V 15/00* | (2006.01) |

(52) U.S. Cl.
CPC .............. *F16K 27/00* (2013.01); *A01G 25/16* (2013.01); *E03B 9/08* (2013.01); *F16L 5/02* (2013.01); *F16L 27/12* (2013.01); *F16L 37/1225* (2013.01); *G01V 15/00* (2013.01)

(58) Field of Classification Search
CPC ......... E03B 9/08; F16L 27/12; F16L 37/1225; F16L 5/02; A01G 25/16; F16K 27/00; G01V 15/00
USPC .................................................. 137/363–372
See application file for complete search history.

(56) References Cited

U.S. PATENT DOCUMENTS

| | | | | |
|---|---|---|---|---|
| 4,431,218 A | * | 2/1984 | Paul, Jr. ................ | F16L 37/144 |
| | | | | 285/305 |
| D421,091 S | | 2/2000 | Kehlbeck | |
| 6,035,887 A | * | 3/2000 | Cato ......................... | E03B 7/08 |
| | | | | 137/343 |
| 6,145,893 A | * | 11/2000 | Kuo ........................ | F16L 27/12 |
| | | | | 137/356 |
| 7,004,677 B1 | | 2/2006 | Ericksen | |
| 7,567,858 B1 | | 7/2009 | Dunlap | |
| 9,518,369 B2 | | 12/2016 | Ducote | |
| 2005/0199842 A1 | * | 9/2005 | Parsons .................. | A01G 25/16 |
| | | | | 251/129.04 |
| 2007/0272305 A1 | | 11/2007 | Schumacher | |
| 2008/0149180 A1 | * | 6/2008 | Parris ...................... | E03B 7/072 |
| | | | | 137/1 |
| 2009/0044869 A1 | | 2/2009 | Brown | |
| 2009/0288715 A1 | * | 11/2009 | Granger, Sr. ............. | E03B 1/04 |
| | | | | 137/337 |
| 2014/0263343 A1 | | 9/2014 | Geerligs | |
| 2016/0029577 A1 | | 2/2016 | Brashear | |

* cited by examiner

Primary Examiner — Kevin F Murphy
Assistant Examiner — Jonathan J Waddy

(57) ABSTRACT

The modular irrigation valve housing comprises a waterproof enclosure that is placed into the ground to house an electrically operated valve. An inlet pipe and an outlet pipe couple to the valve via slip assemblies that slide in and out of the pipes to adjust the distance between pipes and the valve. The slip assemblies mate with receivers that can be coupled to the intake and output of the valve. The slip assemblies comprise double O-rings on one end and a single O-ring and a retaining ring on the other end to form leak proof connections. The box comprises a lid to cover the box, an internal electrical housing for watertight electrical connections to the outside, and a locator device that makes it easier to find the valve when it requires maintenance.

12 Claims, 6 Drawing Sheets

MODULAR IRRIGATION VALVE HOUSING

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of irrigation systems, more specifically, a modular irrigation valve housing.

SUMMARY OF INVENTION

The modular irrigation valve housing comprises a waterproof enclosure that is placed into the ground to house an electrically operated valve. An inlet pipe and an outlet pipe couple to the valve via slip assemblies that slide in and out of the pipes to adjust the distance between pipes and the valve. The slip assemblies mate with receivers that can be coupled to the intake and output of the valve. The slip assemblies comprise double O-rings on one end and a single O-ring and a retaining ring on the other end to form leak proof connections. The box comprises a lid to cover the box, an internal electrical housing for watertight electrical connections to the outside, and a locator device that makes it easier to find the valve when it requires maintenance.

An object of the invention is to provide a protective cover for an irrigation valve.

Another object of the invention is to provide a mechanism to adjust the length of inlet and outlet pipes so that they reach the valve.

A further object of the invention is to facilitate valve replacement without the using of plumbing skills such as cutting an joining pipe.

Yet another object of the invention is to provide a locator device to make the valve easier to locate when it requires maintenance.

These together with additional objects, features and advantages of the modular irrigation valve housing will be readily apparent to those of ordinary skill in the art upon reading the following detailed description of the presently preferred, but nonetheless illustrative, embodiments when taken in conjunction with the accompanying drawings.

In this respect, before explaining the current embodiments of the modular irrigation valve housing in detail, it is to be understood that the modular irrigation valve housing is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the modular irrigation valve housing.

It is therefore important that the claims be regarded as including such equivalent construction insofar as they do not depart from the spirit and scope of the modular irrigation valve housing. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
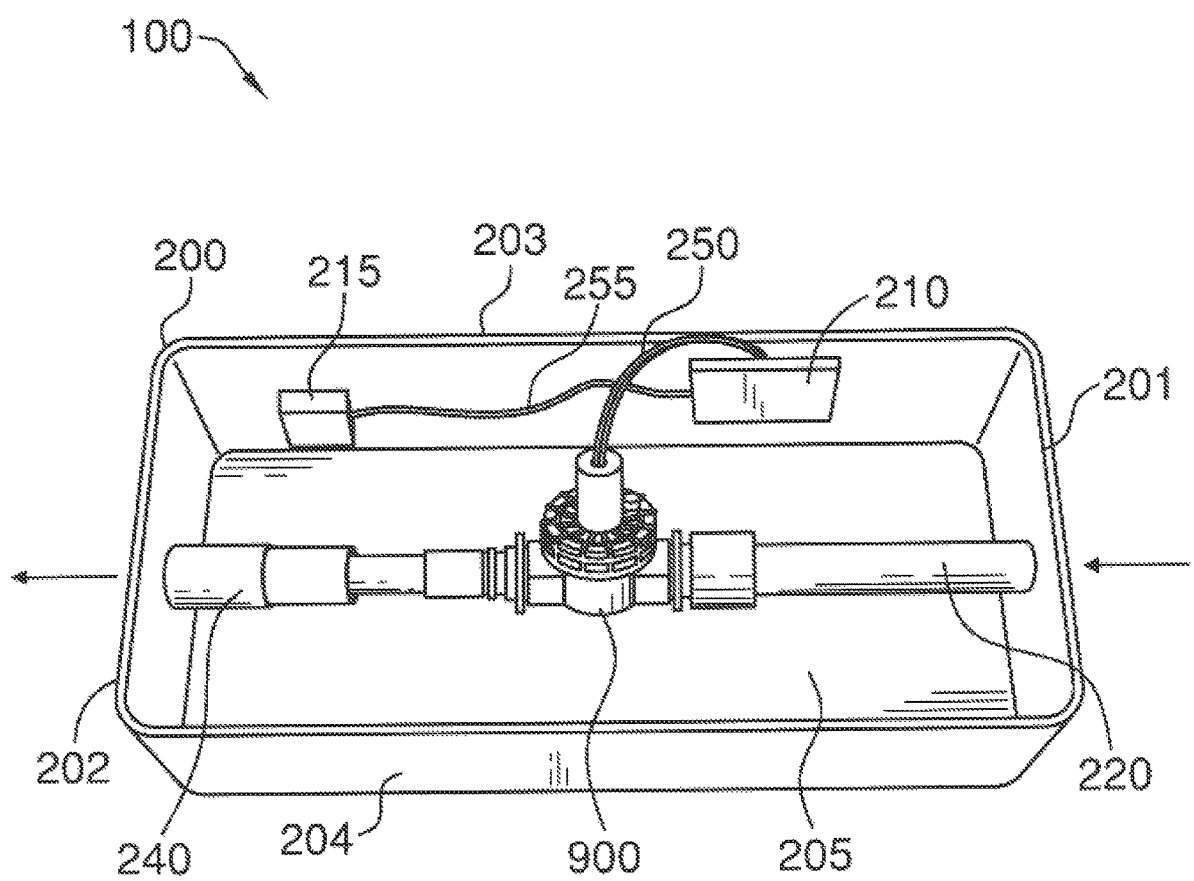
FIG. 1 is a perspective view of an embodiment of the disclosure.
Figure 2:
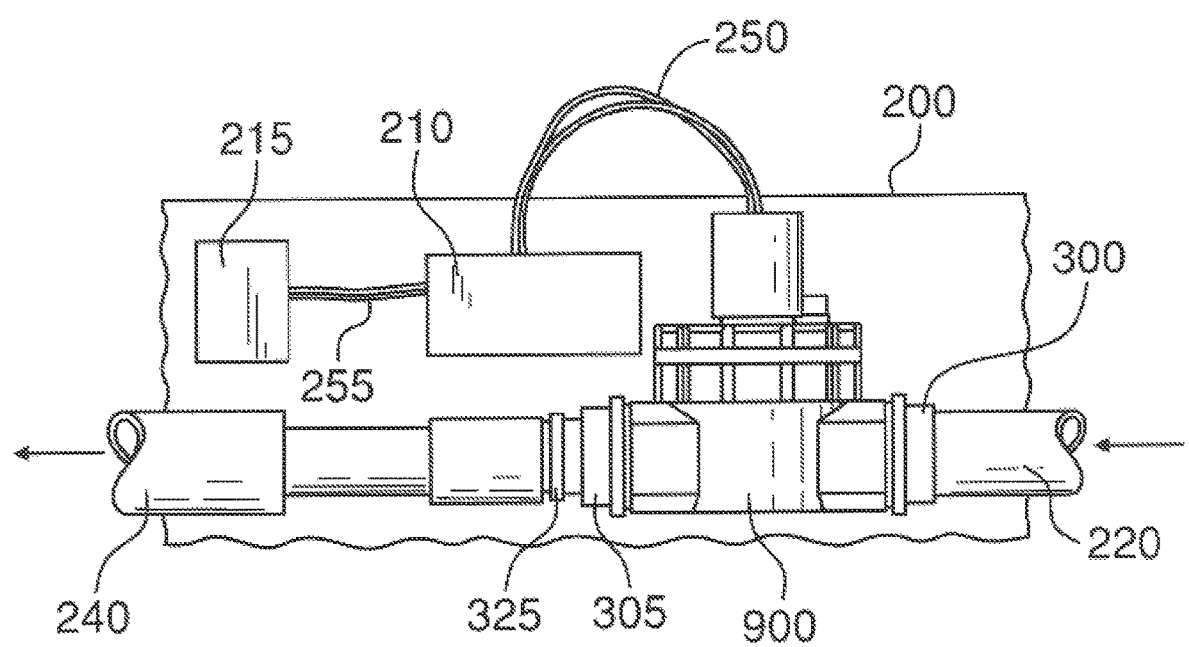
FIG. 2 is a side view of an embodiment of the disclosure.
Figure 3:
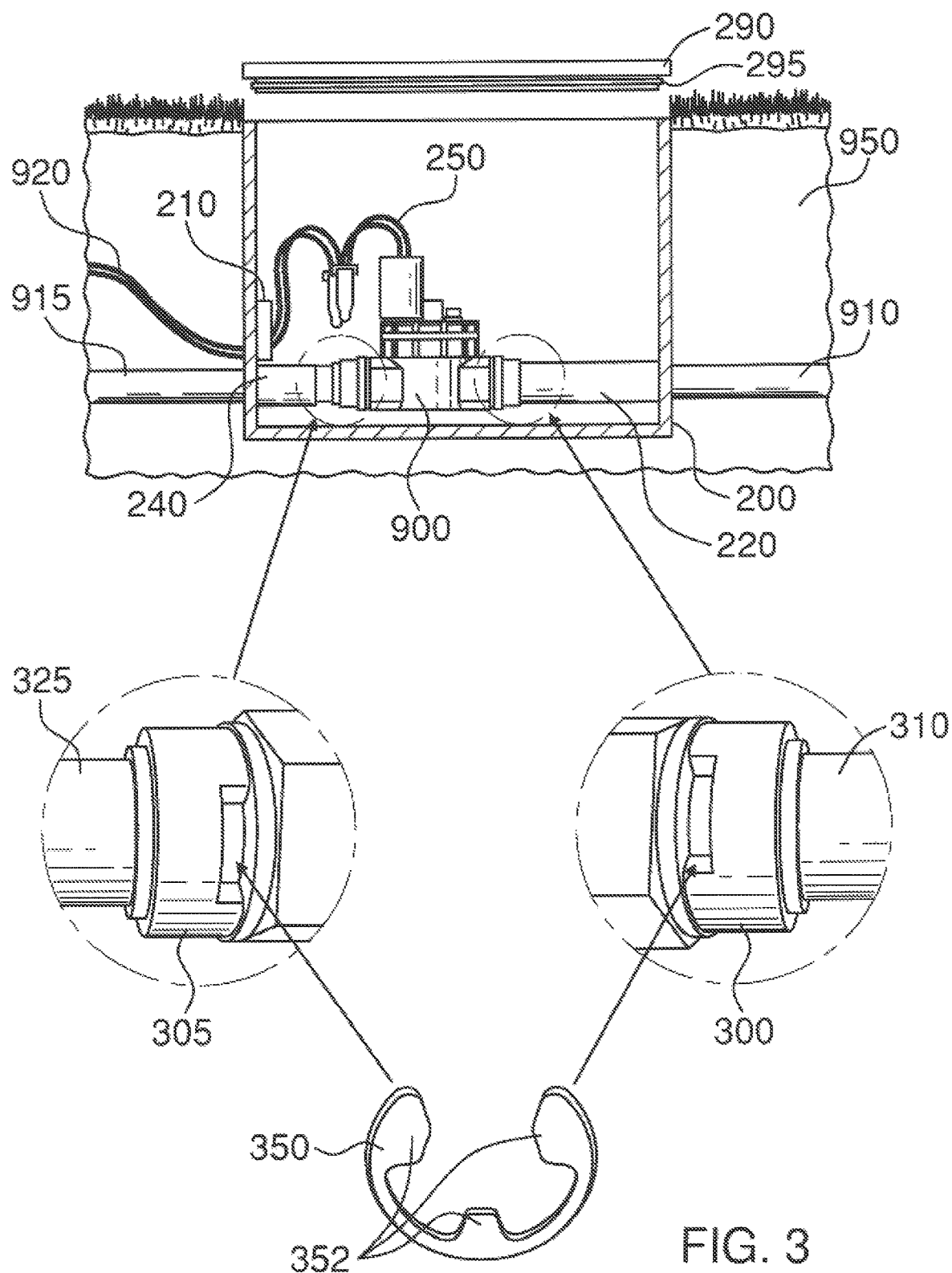
FIG. 3 is a detail view of an embodiment of the disclosure highlighting the receivers added to a valve.
Figure 4:
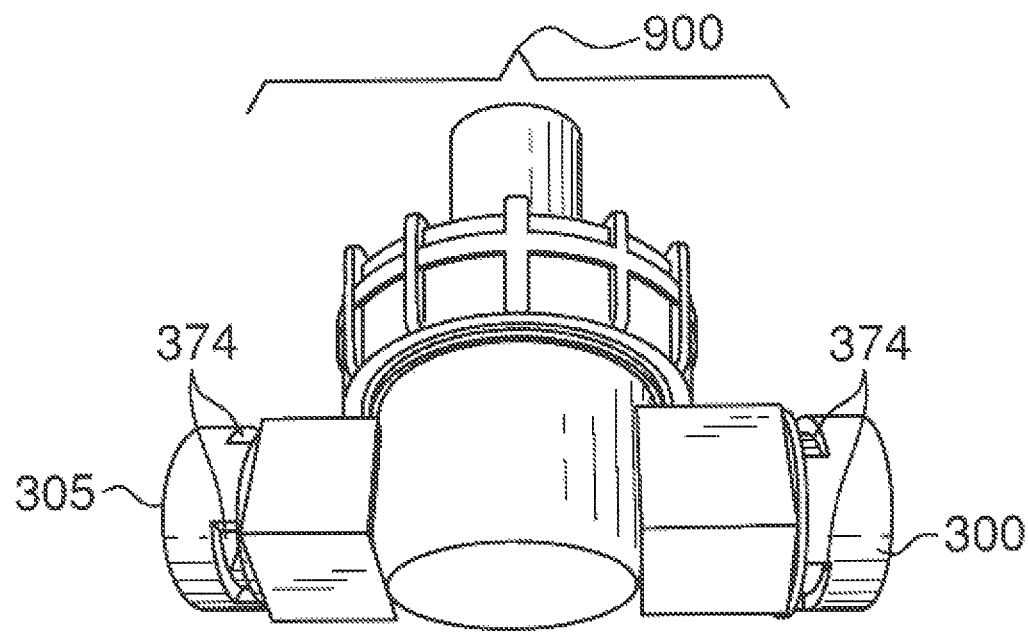
FIG. 4 is a perspective view of an embodiment of the disclosure highlighting the slotted apertures on the receivers added to an off-the-shelf irrigation valve.
Figure 5:
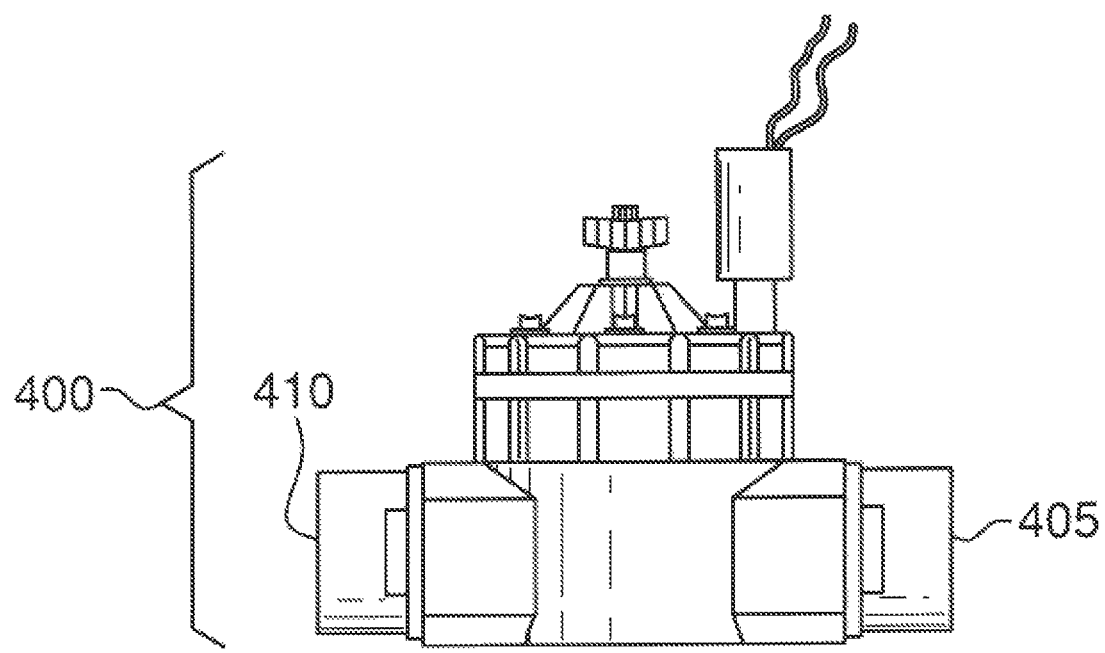
FIG. 5 is a side view of an embodiment of the disclosure illustrating an integral irrigation valve.
Figure 6:
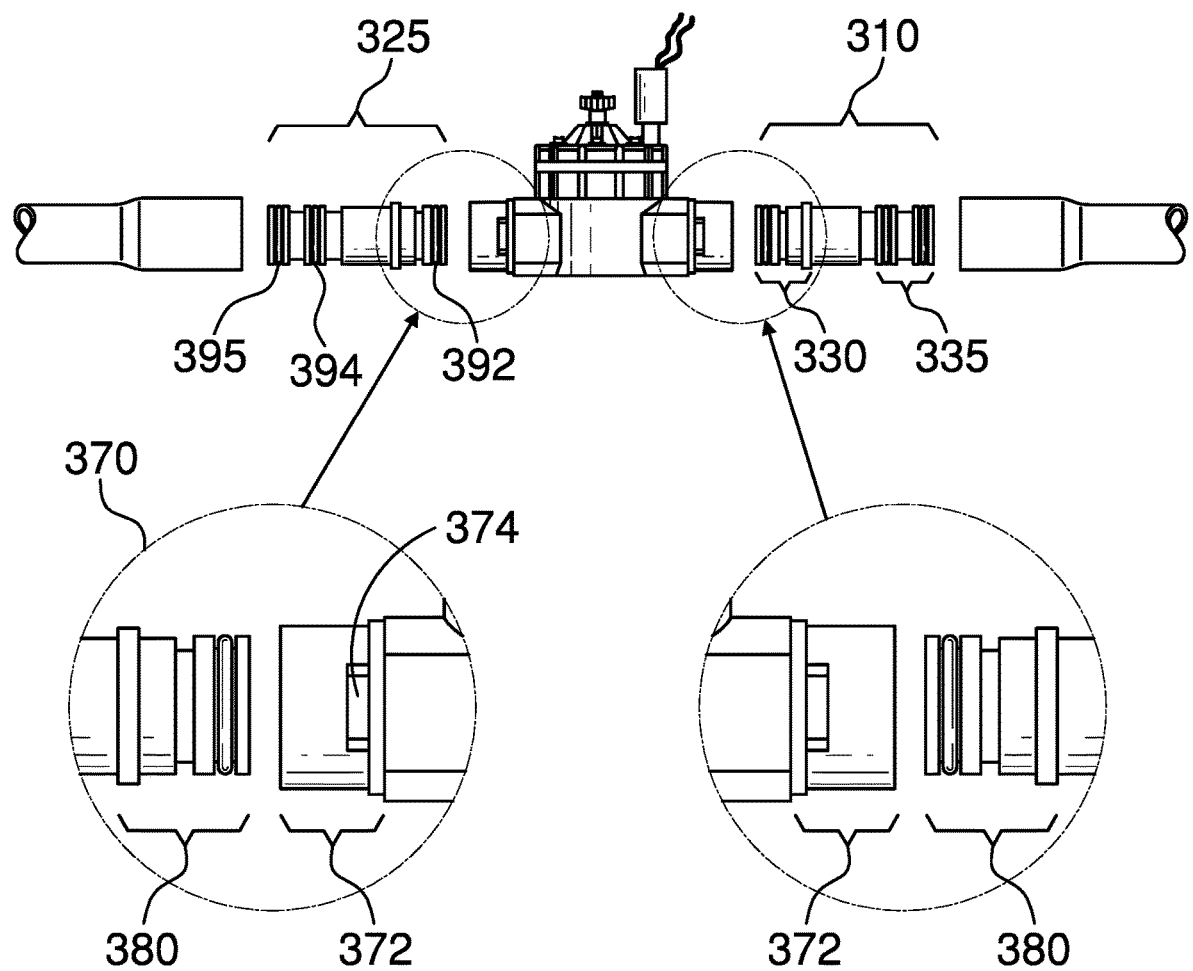
FIG. 6 is an exploded view of an embodiment of the disclosure highlighting the slip assemblies.
Figure 7:
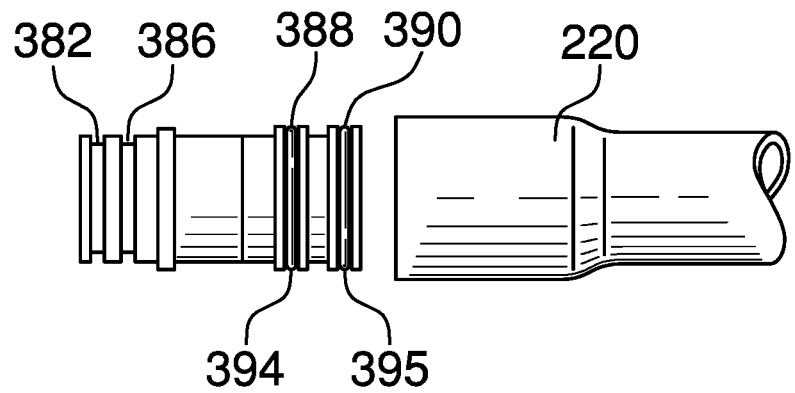
FIG. 7 is a side view of an embodiment of the disclosure highlighting the mating of the slip assembly with the inlet pipe.
Figure 8:
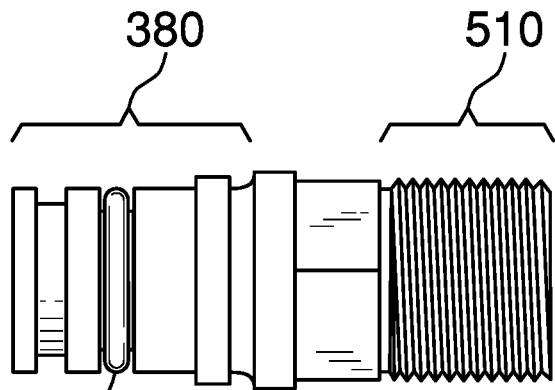
FIG. 8 is a side view of an embodiment of the disclosure highlighting the use of a flexible conduit.
Figure 9:
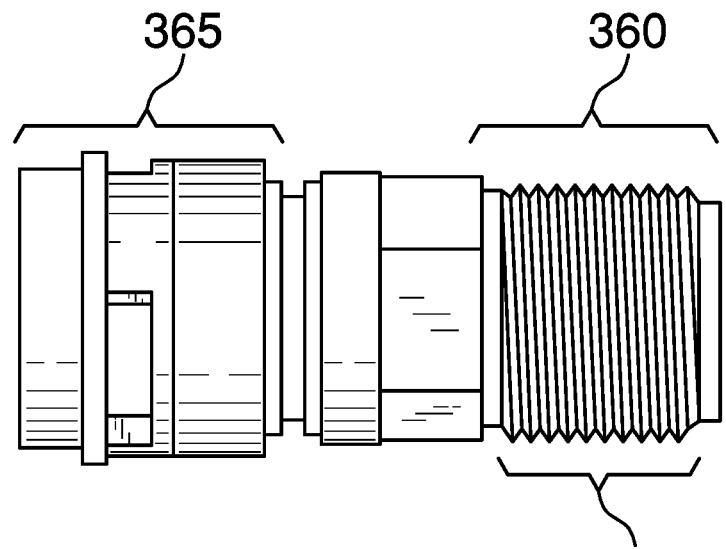
FIG. 9 is a side view of an embodiment of the disclosure illustrating a receiver with a threaded male fitting for coupling to a valve.

Detailed reference will now be made to a first potential embodiment of the disclosure, which is illustrated in FIGS. 1 through 9.

The modular irrigation valve housing 100 (hereinafter invention) comprises a box 200, an inlet pipe 220, an outlet pipe 240, a first slip assembly 310, a second slip assembly 325, a first receiver 300, and a second receiver 305. The invention 100 may be a housing for an irrigation valve. The irrigation valve housed in the invention 100 may be replaced without the need for cutting pipe, joining pipe, or using other traditional plumbing skills. The invention 100 may make the irrigation valve accessible without digging to find the irrigation valve. The invention 100 may provide a locator device 215 for assistance in finding the irrigation valve.

The box 200 is defined by a first side 201, a second side 202, a third side 203, a fourth side 204, and a bottom panel 205. The box 200, when covered by a box lid 290, may be waterproof. The box 200 is buried in the ground 950 such that the top of the box 200 is flush with the ground 950.

The inlet pipe 220 may couple to an incoming irrigation line 910 and pass water (not illustrated in the figures) from a water source (not illustrated in the figures) through the first side 201 to the irrigation valve. The inlet pipe 220 may be mechanically supported by the first side 201 of the box 200 in a watertight manner. The inlet pipe 220 may couple with the incoming irrigation line 910 directly or via an inlet plumbing fitting (not illustrated in the figures) that is coupled to the first side 201 of the box 200 and to the inlet pipe 220. The inlet pipe 220 may comprise one or more reducers to match the diameter of the incoming irrigation line 910 to the diameter of the irrigation valve. The inlet pipe 220 may extend into the box 200 by a distance that is ⅛ to ½ of the overall length of the box 200. The terminal end of the inlet pipe 220 that is inside of the box 200 may comprise a non-threaded, female pipe fitting.

The outlet pipe 240 may couple to an outgoing irrigation line 915 and pass the water from the irrigation valve through the second side 202 to one or more sprinkler heads (not illustrated in the figures). The outlet pipe 240 may be mechanically supported by the second side 202 of the box 200 in a watertight manner. The outlet pipe 240 may couple with the outgoing irrigation line 915 directly or via an outlet plumbing fitting (not illustrated in the figures) that is coupled to the second side 202 of the box 200 and to the outlet pipe 240. The outlet pipe 240 may comprise one or more reducers to match the diameter of the outgoing irrigation line 915 to the diameter of the irrigation valve. The outlet pipe 240 may extend into the box 200 by a distance that is ⅛ to ½ of the overall length of the box 200. The terminal end of the outlet pipe 240 that is inside of the box 200 may comprise a non-threaded, female pipe fitting.

The first slip assembly 310 may comprise a sliding coupler that allows the length of the inlet pipe 220 to be changed. The first slip assembly 310 may be inserted into the inlet pipe 220 and may be moved longitudinally within the inlet pipe 220 until the first slip assembly 310 fills the gap between the inlet pipe 220 and the irrigation valve.

The second slip assembly 325 may comprise a sliding coupler that allows the length of the outlet pipe 240 to be changed. The second slip assembly 325 may be inserted into the outlet pipe 240 and may be moved longitudinally within the outlet pipe 240 until the second slip assembly 325 fills the gap between the outlet pipe 240 and the irrigation valve.

The first slip assembly 310 and the second slip assembly 325 may each comprise a first slip assembly end 330 and a second slip assembly end 335. The first slip assembly end 330 may be a male half 380 of a quick clip fitting 370.

The quick clip fitting 370 comprises a female half 372 and the male half 380. The male half 380 may slide into the female half 372 and may be mechanically retained in place by a retaining ring 350. The quick clip fitting 370 may be sealed from leaking by a first o-ring 392.

Specifically, the male half 380 may comprise a cylindrical pipe having an outside diameter that is less than the inside diameter of the female half 372. The male half 380 may comprise a first groove 382 which laterally encircles the male half 380 and a second groove 386 which laterally encircles the male half 380. The first groove 382 may be located closer to the end of the male half 380 that mates with the female half 372 than the second groove 386. The first o-ring 392 may be placed into the first groove 382 such that the first o-ring 392 laterally encircles the male half 380.

The female half 372 may be a cylindrical pipe segment comprising two or more slotted apertures 374 forming a laterally oriented ring encircling the female half 372.

With the male half 380 pushed into the female half 372 to the point where the second groove 386 aligns with the two or more slotted apertures 374, the retaining ring 350 may be aligned with the two or more slotted apertures 374 and pushed laterally onto the female half 372. The retaining ring 350 may spread open to pass the female half 372 and when the retaining ring 350 returns to its original shape, a plurality of protrusions 352 on the retaining ring 350 may pass through the two or more slotted apertures 374 on the female half 372 and may pass into the second groove 386 of the male half 380.

In some embodiments, the two or more slotted apertures 374 may comprise three apertures and the retaining ring 350 may be an E-clip.

The second slip assembly end 335 may comprise a cylindrical pipe having an outside diameter that is less than the inside diameter of the outlet pipe 240. The second slip assembly end 335 may comprise a third groove 388 which laterally encircles the second slip assembly end 335 and a fourth groove 390 which laterally encircles the second slip assembly end 335. A second o-ring 394 may be placed into the third groove 388 such that the second o-ring 394 laterally encircles the second slip assembly end 335. A third o-ring 395 may be placed into the fourth groove 390 such that the third o-ring 395 laterally encircles the second slip assembly end 335.

The second slip assembly end 335 may push into the inlet pipe 220 or the outlet pipe 240 where the second o-ring 394 and the third o-ring 395 may seal the coupling between the second slip assembly end 335 and the inlet pipe 220 or the outlet pipe and may prevent leaking.

In some embodiments, the first slip assembly end 330 and the second slip assembly end 335 may be different diameters to match the irrigation valve to the inlet pipe 220 or the outlet pipe 240.

The first receiver 300 may be a plumbing fitting that is adapted to couple to an off-the-shelf irrigation valve 900. The first receiver 300 may be adapted to mate the off-the-shelf irrigation valve 900 to the first slip assembly 310.

The second receiver 305 may be a plumbing fitting that is adapted to couple to the off-the-shelf irrigation valve 900. The second receiver 305 may be adapted to mate the off-the-shelf irrigation valve 900 to the second slip assembly 325.

The first receiver 300 and the second receiver 305 may each comprise a first receiver end 360 and a second receiver end 365. The first receiver end 360 may match a pipe interface of the off-the-shelf irrigation valve 900. As a non-limiting example, the first receiver end 360 may be a threaded male fitting 315 having a diameter and thread size that complements a female threaded fitting on the off-the-shelf irrigation valve 900.

The second receiver end 365 may comprise the female half 372 of the quick clip fitting 370 as previously described.

The box lid 290 may be a top cover for the box 200. The box lid 290 may couple with the box 200 to form a waterproof seal. In some embodiments, the box lid 290 may comprise a lid O-ring 295 to achieve the waterproof seal.

The box 200 may comprise an electrical housing 210. The electrical housing 210 may be a waterproof enclosure inside of the box 200 that distributes electrical energy to the irrigation valve and to the locator device 215. The electrical housing 210 may accept an incoming electrical connection 920 from outside of the box 200 and may couple the incoming electrical connection 920 to the irrigation valve via valve wiring 250. The presence or absence of electrical energy provided to the irrigation valve from the incoming electrical connection 920 via the valve wiring 250 may cause the irrigation valve to open and allow the water to flow through the irrigation valve from the water source to the one or more sprinkler heads or may cause the irrigation valve to close and block the flow of the water.

The invention 100 may further comprise the locator device 215. The locator device 215 may be a device able to determine and report its own position. The locator device 215 may be powered via locator wiring 255 that is coupled to the incoming electrical connection 920 within the electrical housing 210. The locator device 215 may report its position wirelessly. As a non-limiting example, the locator device 215 may comprise a GPS unit to determine its position in terms of latitude and longitude and may report its position via a WiFi connection to a browser application running on a smartphone outside of the box 200.

In some embodiments, the invention 100 may comprise an integral irrigation valve 400. The integral irrigation valve 400 may be an electrically operated water valve which comprises the female half 372 of the quick clip fitting 370 at both a valve intake port 405 and at a valve output port 410.

In some embodiments, the inlet pipe 220 and the first slip assembly 310, the outlet pipe 240 and the second slip assembly 325, or both may be replaced by a flexible conduit 510 comprising the male half 380 of the quick clip fitting 370 on the terminal end of the flexible conduit 510. The non-terminal end of the flexible conduit 510 may be coupled to the first side 201, the second side 202, or directly to the incoming irrigation line 910 or the outgoing irrigation line 915. The terminal end with the male half 380 of the quick clip fitting 370 may couple to the female half 372 of the quick clip fitting 370 located on the irrigation valve.

In use, the invention 100 may be buried in the ground 950 so that the top of the box 200 is flush with the ground 950. The incoming irrigation line 910 may be coupled to the first side 201 and the outgoing irrigation line 915 may be coupled to the second side 202. If the embodiment does not comprise the integral irrigation valve 400, the off-the-shelf irrigation valve 900 may be installed by coupling the first receiver 300 and the second receiver 305 to the off-the-shelf irrigation valve 900, placing the off-the-shelf irrigation valve 900 into the box 200, sliding the first slip assembly 310 into the first receiver 300, sliding the second slip assembly 325 into the second receiver 305, placing the retaining rings 350 onto the first receiver 300 and the second receiver 305 to hold the first slip assembly 310 and the second slip assembly 325 in place, and connecting the valve wiring 250 to the off-the-shelf irrigation valve 900.

The irrigation valve may be operated by applying or removing electrical energy to the incoming electrical connection 920 to open or close the irrigation valve.

In the event that the irrigation valve fails, the box 200 may be located by applying electrical energy to the locator device 215 via the incoming electrical connection 920 and reading its position from an external device that is in wireless communication with the locator device 215. A faulty valve may be replaced by removing the box lid 290, pulling the retaining rings 350 off of both sides of the irrigation valve, sliding the first slip assembly 310 and the second slip assembly 325 away from the irrigation valve, disconnecting the valve wiring 250 from the irrigation valve, and lifting the irrigation valve from the box 200. A replacement valve may be installed following the process described above.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used in this disclosure, an "application" or "app" is software that is specifically designed for use with a personal computing device.

As used in this disclosure, a "clip" is a fastener that attaches to an object by gripping or clasping the object. A clip is typically spring loaded.

As used herein, the words "couple", "couples", "coupled" or "coupling", refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used herein, "retaining ring" (also known as a retention ring) refers to a springy, circular clip that is used to retain a component on a shaft or in housings. The retaining ring may be stamped from a flat piece of spring steel or may be formed from wire. A retaining rings typically seats into a groove around a shaft, which prevents the retaining ring from moving longitudinally on the shaft. The circular shape comprises a gap that allows the retaining ring to spread while being installed or removed. A circlip or snap ring is a particular type of retaining ring comprising an aperture at each end of the ring. The apertures may be used by a spreading tool to install or remove the circlip. Some retaining rings may comprise radial protrusions that point towards the center of the circlips. A retaining ring with three such protrusions is sometimes refer to as an E-clip.

As used in this disclosure, "flexible" refers to an object or material which will deform when a force is applied to it, which will not return to its original shape when the deforming force is removed, and which may not retain the deformed shape caused by the deforming force.

As used in this disclosure, the term "flush" is used to describe that a first surface is aligned with a second surface.

As used herein, "GPS" refers to a device that uses signals received from a system of navigational satellites to determine the position of the device. GPS is an acronym for Global Positioning System.

As used in this disclosure, a "housing" is a rigid casing that encloses and protects one or more devices.

As used herein, "inside diameter" refers to a measurement made on a hollow conduit. Specifically, the inside diameter is the distance from one inside wall to the opposite inside wall. If the conduit is round, then the inside diameter is a true diameter, however the term may also be used in connection with a square conduit in which case the inside diameter is simply the narrowest inside measurement that passes through the center of the conduit.

As used in this disclosure, the word "lateral" refers to the sides of an object or movement towards a side. Lateral directions are generally perpendicular to longitudinal directions. "Laterally" refers to movement in a lateral direction.

As used in this disclosure, a "lid" is a removable cover that is placed on a hollow structure to contain and/or protect the contents within the hollow structure.

As used herein, the word "longitudinal" or "longitudinally" refers to a lengthwise or longest direction.

As used herein, "mate" refers to coupling at a predefined interface.

As used herein, "outside diameter" refers to a measurement made on an object. Specifically, the outside diameter is the distance from one point on the outside of the object to a point on the opposite side of the object along a line passing through the center of the object. The term outside diameter is frequently used in conjunction with round objects such as hollow conduits in which case the outside diameter is a true diameter, however the term may also be used in connection with a square object in which case the outside diameter is simply the widest outside measurement that passes through the center of the conduit.

As used in this disclosure, a "pipe" is a hollow cylindrical device that is used for transporting liquids and gases or for structural purposes. The line that connects the center of the first base of the cylinder to the center of the second base of the cylinder is referred to as the axis of the cylinder or the centerline of the pipe. When two pipes share the same centerline they are said to be aligned. In this disclosure, the terms inner diameter of a pipe and outer diameter are used as they would be used by those skilled in the plumbing arts.

As used in this disclosure, a "valve" is a device that is used to control the flow of a fluid (gas or liquid) through a pipe or to control the flow of a fluid into and out of a container.

As used herein, the words "waterproof" or "watertight" refer to an object that is not harmed when being exposed to water, including total submersion for a period of time. When used as a verb, "waterproof" refers to taking steps to make an object waterproof. Non-limiting examples of such steps may include applying special coatings or using gaskets to seal seams and entry points of an enclosure.

As used in this disclosure, "WiFi" refers to the physical implementation of a collection of wireless electronic communication standards commonly referred to as IEEE 802.11x and used for wireless communication between devices.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

As used in this disclosure, "wireless" is an adjective that is used to describe a communication channel that does not require the use of physical cabling.

With respect to the above description, it is to be realized that the optimum dimensional relationship for the various components of the invention described above and in FIGS. 1 through 9, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A modular irrigation valve housing comprising:
a box, an inlet pipe, an outlet pipe, a first slip assembly, a second slip assembly, a first receiver, and a second receiver;
wherein the modular irrigation valve housing is a housing for an irrigation valve;
wherein the modular irrigation valve housing makes the irrigation valve accessible without digging to find the irrigation valve;
wherein the modular irrigation valve housing provides a locator device for assistance in finding the irrigation valve;
wherein the box is defined by a first side, a second side, a third side, a fourth side, and a bottom panel;
wherein the box, when covered by a box lid, is waterproof;
wherein the box is buried in the ground such that the top of the box is flush with the ground;
wherein the inlet pipe couples to an incoming irrigation line and passes water from a water source through the first side to the irrigation valve;
wherein the inlet pipe is mechanically supported by the first side of the box in a watertight manner;
wherein the inlet pipe couples with the incoming irrigation line directly or via an inlet plumbing fitting that is coupled to the first side of the box and to the inlet pipe;
wherein the outlet pipe couples to an outgoing irrigation line and passes the water from the irrigation valve through the second side to one or more sprinkler heads;
wherein the outlet pipe is mechanically supported by the second side of the box in a watertight manner;
wherein the outlet pipe couples with the outgoing irrigation line directly or via an outlet plumbing fitting that is coupled to the second side of the box and to the outlet pipe;
wherein the first slip assembly comprises a sliding coupler;
wherein the first slip assembly is inserted into the inlet pipe and is moved longitudinally within the inlet pipe until the first slip assembly fills a gap between the inlet pipe and the irrigation valve;
wherein the second slip assembly comprises a sliding coupler;
wherein the second slip assembly is inserted into the outlet pipe and is moved longitudinally within the outlet pipe until the second slip assembly fills a gap between the outlet pipe and the irrigation valve;
wherein the first slip assembly and the second slip assembly are each further defined with a first slip assembly end and a second slip assembly end;
wherein there is at least one quick clip fitting comprising a female half and a male half;

wherein the male half comprises the first slip assembly of either of the slip assemblies and the female half comprises an end of either of the receivers;

wherein the quick clip fitting is sealed from leaking by a first o-ring;

wherein the male half comprises a cylindrical pipe having an outside diameter that is less than the inside diameter of the female half;

wherein the male half comprises a first groove which laterally encircles the male half and a second groove which laterally encircles the male half;

wherein the first groove is located closer to the end of the male half that mates with the female half than the second groove;

wherein the first o-ring is placed into the first groove such that the first o-ring laterally encircles the male half;

wherein the female half is a cylindrical pipe segment comprising two or more slotted apertures forming a laterally oriented ring encircling the female half.

2. The modular irrigation valve housing according to claim 1 wherein with the male half pushed into the female half to the point where the second groove aligns with the two or more slotted apertures, a retaining ring is aligned with the two or more slotted apertures and pushed laterally onto the female half;

wherein a plurality of protrusions on the retaining ring pass through the two or more slotted apertures on the female half and pass into the second groove of the male half.

3. The modular irrigation valve housing according to claim 2 wherein the two or more slotted apertures number exactly three apertures and the retaining ring is an E-clip.

4. The modular irrigation valve housing according to claim 2 wherein the second slip assembly comprises a cylindrical pipe having an outside diameter that is less than the inside diameter of the outlet pipe;

wherein the second slip assembly comprises a third groove which laterally encircles the second slip assembly end of the second slip assembly and a fourth groove which laterally encircles the second slip assembly end of the second slip assembly;

wherein a second o-ring is placed into the third groove such that the second o-ring laterally encircles the second slip assembly;

wherein a third o-ring is placed into the fourth groove such that the third o-ring laterally encircles the second slip assembly.

5. The modular irrigation valve housing according to claim 4 wherein the second slip assembly pushes into the outlet pipe where the second o-ring and the third o-ring seal the coupling between the second slip assembly and the outlet pipe and prevent leaking.

6. The modular irrigation valve housing according to claim 5 wherein the first receiver is a plumbing fitting that is adapted to couple to an off-the-shelf irrigation valve;

wherein the first receiver is adapted to mate the off-the-shelf irrigation valve to the first slip assembly.

7. The modular irrigation valve housing according to claim 6 wherein the second receiver is a plumbing fitting that is adapted to couple to the off-the-shelf irrigation valve;

wherein the second receiver is adapted to mate the off-the-shelf irrigation valve to the second slip assembly.

8. The modular irrigation valve housing according to claim wherein the first receiver and the second receiver are each further defined with a first receiver end and a second receiver end;

wherein either of the first receiver ends matches a pipe interface of the off-the-shelf irrigation valve;

wherein either of the second receiver ends makes up the female half of the quick clip fitting.

9. The modular irrigation valve housing according to claim 5 wherein the box lid is a top cover for the box;

wherein the box lid couples with the box to form a waterproof seal;

wherein the box lid comprises a lid O-ring to achieve the waterproof seal.

10. The modular irrigation valve housing according to claim wherein the box comprises an electrical housing;

wherein the electrical housing is a waterproof enclosure inside of the box that distributes electrical energy to the irrigation valve and to the locator device;

wherein the electrical housing accepts an incoming electrical connection from outside of the box and couples the incoming electrical connection to the irrigation valve via valve wiring;

wherein the presence or absence of electrical energy provided to the irrigation valve from the incoming electrical connection via the valve wiring causes the irrigation valve to open and allows the water to flow through the irrigation valve from the water source to the one or more sprinkler heads or causes the irrigation valve to close and block the flow of the water.

11. The modular irrigation valve housing according to claim 10 wherein the modular irrigation valve housing further comprises the locator device;

wherein the locator device is a device able to determine and report its own position;

wherein the locator device is powered via locator wiring that is coupled to the incoming electrical connection within the electrical housing;

wherein the locator device reports its position wirelessly.

12. The modular irrigation valve housing according to claim wherein the modular irrigation valve housing comprises an integral irrigation valve.

* * * * *